United States Patent [19]

Teraoka

[11] Patent Number: 5,485,725
[45] Date of Patent: Jan. 23, 1996

[54] CONTINUOUSLY VARIABLE TRANSMISSION

[75] Inventor: Masao Teraoka, Tochigi, Japan

[73] Assignee: Tochigi Fugi Sangyo Kabushiki Kaisha, Japan

[21] Appl. No.: 18,946

[22] Filed: Feb. 17, 1993

[30] Foreign Application Priority Data

Feb. 18, 1992 [JP] Japan .................... 4-030844
Sep. 7, 1992 [JP] Japan .................... 4-238186

[51] Int. Cl.$^6$ .................................... F16D 39/00
[52] U.S. Cl. .................................... 60/491; 418/16
[58] Field of Search ............ 60/487, 490, 491; 418/16

[56] References Cited

U.S. PATENT DOCUMENTS

| | | |
|---|---|---|
| 1,777,851 | 10/1930 | Kuhn . |
| 2,417,218 | 3/1947 | Segsworth .................... 60/491 |
| 2,570,411 | 10/1951 | Vickers .................... 418/16 |
| 2,685,842 | 8/1954 | Hufferd . |
| 3,135,093 | 6/1964 | Hoffman, III . |
| 3,234,816 | 2/1966 | Thuengen .................... 418/16 |
| 3,252,284 | 5/1966 | Thuengen .................... 60/491 |
| 3,334,546 | 8/1967 | Apiala .................... 418/16 |
| 4,545,204 | 10/1985 | Whalen .................... 60/491 |

FOREIGN PATENT DOCUMENTS

| | | |
|---|---|---|
| 523856 | 4/1931 | Germany . |
| 1067275 | 10/1959 | Germany . |
| 1914897 | 2/1963 | Germany . |

*Primary Examiner*—Edward K. Look
*Assistant Examiner*—Hoang Nguyen
*Attorney, Agent, or Firm*—Graham & James

[57] ABSTRACT

A continuously variable transmission employing a vane pump and a vane motor has a mechanism for mutually moving housings of the vane pump and the vane motor or for moving each independently. The mechanism can gradually decrease the eccentricity of the internal circumference of the housing of the vane pump with respect to a rotor of the vane pump while increasing the eccentricity of the internal circumference of the housing of the vane motor with respect to a rotor of the vane motor, or vice versa, thereby regulating the rotative speed output from the vane motor.

6 Claims, 9 Drawing Sheets

CONTINUOUSLY VARIABLE TRANSMISSION

TECHNICAL FIELD

The present invention relates generally to a continuously variable transmission for continuously changing the speed of a rotative driving force conveyed to the transmission and more particularly to a continuously variable transmission of an oil pump/motor type, especially a vane pump/motor, which is one type of hydrostatic transmission which can be employed in automobiles.

BACKGROUND OF THE INVENTION

Hydrostatic nonstep transmissions (hereinafter referred to as "HST") have been widely employed due to their advantages. For example, the handling and controlling of the HST are easy and even though the size is relatively small, a relatively large torque can be obtained. The HST has an oil pump, which is basically driven by the rotative driving force of an engine and an oil motor which is driven by the pressure of a fluid discharged from the oil pump.

A conventional HST has been disclosed in "Power Design" 1991, vol.29, #1, pp.9–pp.17. The conventional HST employs a swash plate type piston pump/motor.

Figure 1:
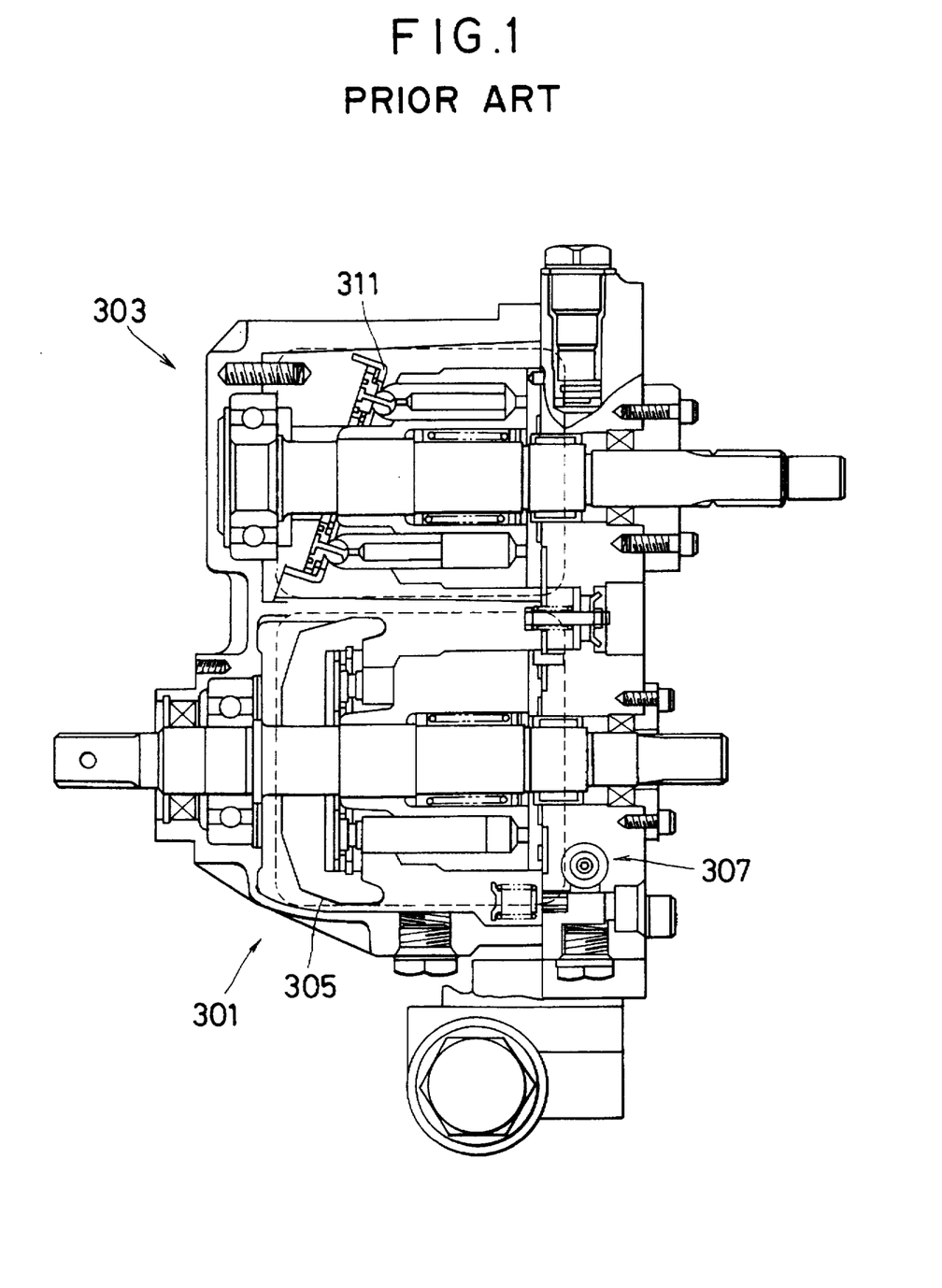
FIG. 1 is a cross sectional view of a conventional HST.

FIG. 1 shows an HST which has a similar construction to the above-mentioned conventional HST. The HST represented in FIG. 1 includes a swash plate type piston pump 301 and a swash plate type piston motor 303. In order to change the speed transmitted is given from an engine and the like to the HST the inclination of a swash plate 305 is regulated to change the pressure and the amount of a fluid discharged from a piston pump 301, thereby changing the output rotative speed of a piston motor 303. In the HST, a regulating mechanism for regulating the inclination and a check valve 307 and the like are necessary. However, these members or the mechanism are relatively complex and expensive. In addition, in the HST, the friction loss is relatively high, resulting in low efficiency. Furthermore, since the piston motor 303 employs a fixed type of swash plate 311, regulating the inclination of the swash plate 311 is not possible, whereby only a speed changing characteristic can be obtained.

SUMMARY OF THE INVENTION

In view of the above, an object of the present invention is to solve the aforementioned problems in the prior art through the provision of a continuously variable transmission wherein the structure thereof is not complex, is relatively small and light, has sufficient efficiency, and is relatively inexpensive and wherein the operation of changing the speed is simple.

Another object of this invention is to provide a continuously variable transmission wherein several speed-change characteristics can be obtained.

First, the afore mentioned object of the present invention is accomplished through the provision of a continuously variable transmission comprising: a casing; a vane pump for receiving the rotative driving force and discharging a variable amount of fluid, the vane pump having a first housing movably supported inside the casing, a first rotor with a rotor shaft secured to the casing and rotatably accommodated inside the first housing, and a plurality of vanes held by the first rotor; a vane motor driven by the pressure of the fluid discharged from the vane pump, outputting a rotative speed, and constructed so as to return the fluid discharged therefrom to the vane pump, the vane motor having a second housing movably supported inside the casing, a second rotor with a rotor shaft secured to the casing and rotatably accommodated inside the second housing, and a plurality of vanes held by the second rotor; an eccentricity-controlling mechanism for mutually moving the first and second housings so as to gradually decrease the eccentricity of the internal circumference of the first housing with respect to the first rotor while increasing the eccentricity of the internal circumference of the second housing with respect to the second rotor, or vice versa, to regulate the rotative speed output from the vane motor.

In a preferred embodiment of the above described continuously variable transmission, the eccentricity-controlling mechanism comprises a rotation mechanism for rotating the first and second housings each of which has an internal circumference with a rotatable axis which is eccentric with respect to axis of a periphery of each of the first and second housings.

Further, in another preferred embodiment of the above described continuously variable transmission, the eccentricity-controlling mechanism comprises a slide mechanism for sliding the first and second housings, and preferably the slide mechanism comprises a second driving source with a driving force and second transforming means for transforming the driving force of the second driving source to a sliding motion in the first and second housings.

Second, the afore mentioned object of the present invention is accomplished through the provision of a continuously variable transmission comprising: a casing; a vane pump for receiving the rotative driving force and discharging a variable amount of fluid, the vane pump having a first housing movably supported inside the casing, a first rotor with a rotor shaft secured to the casing and rotatably accommodated inside the first housing, and a plurality of vanes held by the first rotor; a vane motor driven by the pressure of the fluid discharged from said vane pump, outputting a rotative speed, and constructed so as to return the fluid discharged therefrom to the vane pump, the vane motor having a second housing movably supported inside the casing, a second rotor with a rotor shaft secured to said casing and rotatably accommodated inside the second housing, and a plurality of vanes held by the second rotor, a first mechanism for independently moving said first housing so as to change the eccentricity of said first housing with respect to said first rotor to regulate the rotative speed output from said vane motor, and a second mechanism for independently moving said second housing so as to change the eccentricity of said second housing with respect to said second rotor to regulate the rotative speed output from said vane motor.

In a preferred embodiment, the first mechanism comprises a first slide mechanism for sliding the first housing and the second mechanism comprises a second slide mechanism for sliding the second housing.

In the case in which the eccentricity-controlling mechanism comprises the rotation mechanism or the slide mechanism in the above described continuously variable transmission, the rotation mechanism or the slide mechanism, while mutually rotating or sliding the first and second housings, gradually decreases the eccentricity of the second cam ring with respect to the second rotor and increases the eccentricity of the first cam ring with respect to the first rotor, or vice versa, thereby regulating the rotative speed output from the vane motor. Specifically, when the first and second housings are mutually rotated or caused to slide by the rotation mechanism or the slide mechanism, the eccentricities in the vane pump and the vane motor are mutually changed. Accordingly, the amount of fluid discharged from the vane pump and the rotative speed of the vane motor are continuously changed, thus accomplishing a continuous change in speed of the rotative driving force conveyed to the continuously variable transmission.

In the continuously variable transmission having the first and second mechanisms, when each of the first and second housings is moved, (preferably by sliding,) by each of the first and second mechanisms, (preferably by each of the first and second slide mechanisms,) each of the eccentricities in the vane pump and the vane motor respectively are changed independently. For example, if the eccentricity in the vane motor is gradually changed in a condition in which a predetermined eccentricity in the vane pump is maintained, the rotative speed output from the vane motor is continuously changed, thereby continuously changing the speed of a rotative driving force conveyed to the vane pump in a speed changing characteristic. Furthermore, if the eccentricity in the vane motor is gradually changed in a condition in which another predetermined eccentricity in the vane pump is maintained, the rotative speed output from the vane motor is continuously changed, whereby another speed-change characteristic can be obtained. Thus, the speed-change characteristics can be easily changed, thereby allowing the choice of a preferred speed-change characteristic for both a prime motor for driving the vane pump and a driven mechanism driven by the vane motor.

Moreover, since oil pump/motor type transmissions have a simple construction, are easily made small and light, and are relatively inexpensive, the continuously variable transmission according to the present invention can be of simple construction, be easily made small and light, and be relatively inexpensive. Further, in the continuously variable transmission according to the present invention the operation for changing the speed may be easily performed by using the eccentricity-controlling mechanism, preferably employing the rotation mechanism along with the movable first and second axes of the first and second cam rings, or slide mechanism, or the first and second mechanisms. Furthermore, in a lightly loaded region, the friction loss of the continuously variable transmission according to the present invention is relatively low, thereby resulting in sufficient efficiency.

DETAILED DESCRIPTION OF THE PREFERRED EMBODIMENTS

Continuously variable transmissions according to the present invention will be described hereinafter with reference to FIGS. 2–10. Some members, or portions, or parts which appear without reference numerals in the following description are not illustrated in FIGS. 2–10.

First Embodiment

A first embodiment according to the present invention will be described hereinafter with reference to FIGS. 2 and 3.

A continuously variable transmission according to the first embodiment may be employed for conveying the driving force of an engine to an auxiliary mechanism in an automobile.

Figure 2:
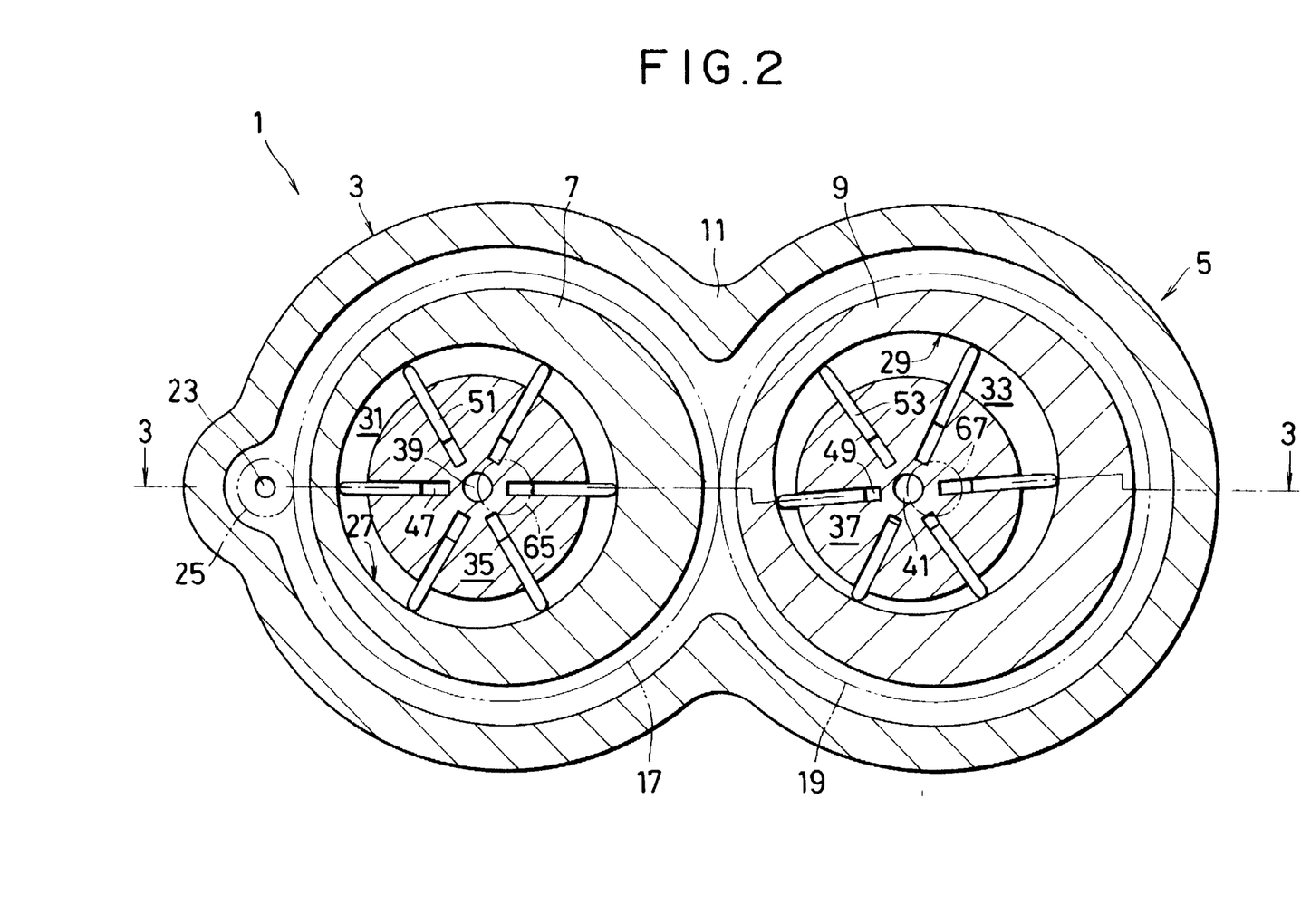
FIG. 2 is a cross sectional view of a continuously variable transmission of a first embodiment according to the present invention.
Figure 3:
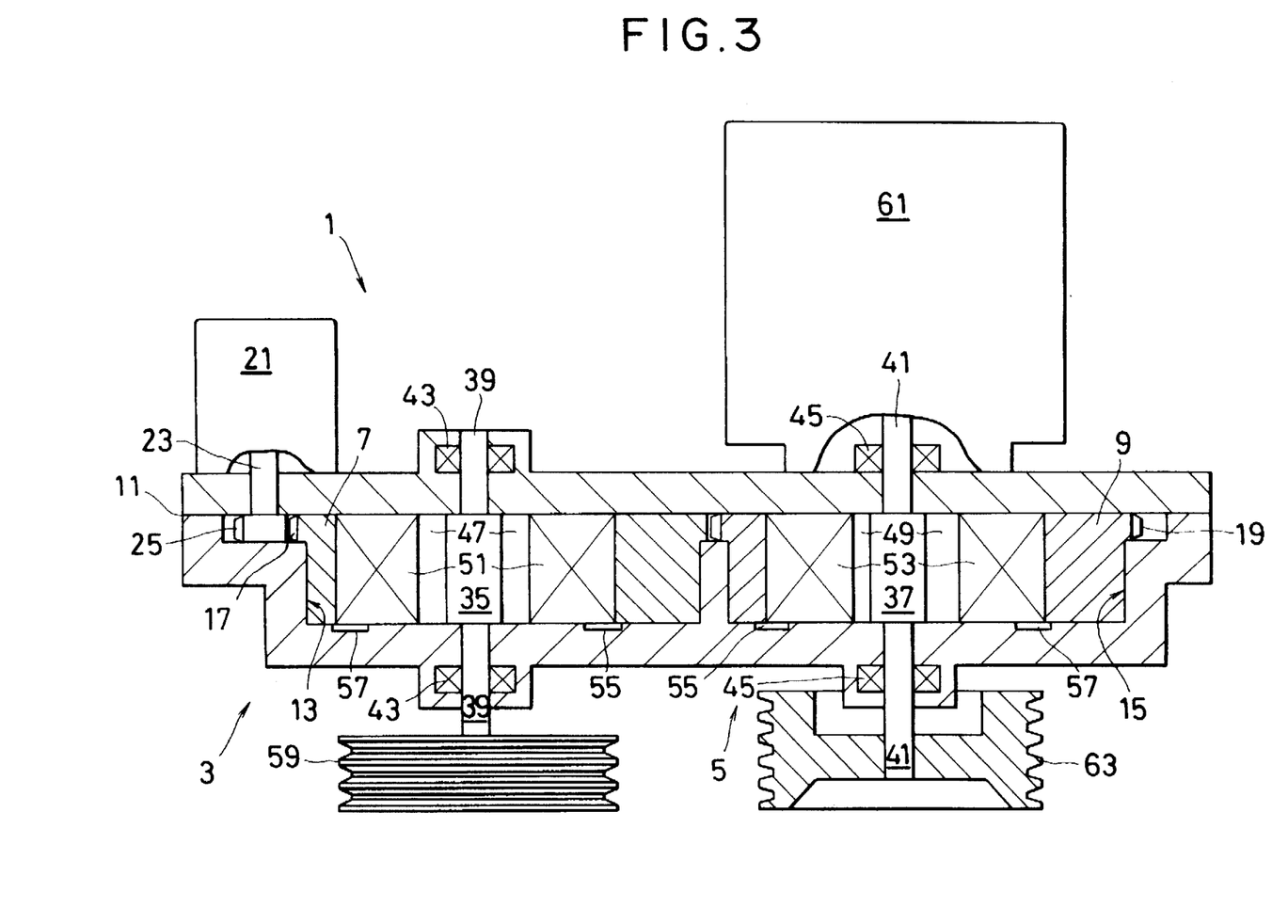
FIG. 3 is a cross sectional view taken in the direction shown by arrows 3 of FIG. 2.

As shown in FIGS. 2 and 3, the continuously variable transmission 1 comprises a vane pump 3 and a vane motor 5.

Housings 7, 9 of the vane pump 3 and the vane pump 5 respectively are rotatably supported inside cylindrical bearings 13, 15 of a casing 11, respectively, as shown in FIG. 3. Gears 17, 19 are provided around the peripheries of the housings 7, 9 respectively and are mutually engaged as shown in FIG. 2. Further, the gear 17 of the vane pump 17 engages a gear 25 which is provided on a rotary shaft 23 of a controlled motor 21 as shown in FIG. 3. Thus, the housings 7, 9 may mutually rotate through rotation of the rotary shaft 23 of the controlled motor 21.

The housings 7, 9 include cam rings 27, 29 respectively which form the internal circumferences of the housings 7, 9, respectively. Oil pressure chambers 31, 33 are formed between the cam rings 27, 29 and the casing 11, respectively, and can be filled with a variable amount of hydraulic fluid. Rotors (vane rotors) 35, 37 are positioned inside the oil pressure chambers 31, 33 and are accommodated inside the cam rings 27, 29, respectively. The rotors 35, 37 are provided with rotor shafts 39, 41 respectively, each of which is rotatably secured to the casing 11. In other words, the rotors 35, 37 are rotatably secured to the casing 11, respectively. Seals 43, 45 for preventing oil leakage are provided between each of the rotor shafts 39, 41 and the casing 11, respectively.

The rotors 35, 37 have a plurality of radially extending grooves 47,49 inside which a plurality of vanes 51, 53 are slidably held along the diametrical directions of the rotors 35, 37, respectively as shown in FIG. 2. The casing 11 is provided with a pair of oil guides 55, 57 which link the discharge side of the vane pump 3 with the fluid inlet side of the vane motor 5 as well as the fluid outlet side of the vane motor 5 with the suction side of the vane pump 3 as shown in FIG. 3. Thus, the hydraulic fluid circulates between the vane pump 3 and the vane motor 5.

The vanes 51 of the vane pump 3 are pressed toward the cam ring 27 by centrifugal force caused by rotation of the rotor 35 when the rotor 35 is driven. On the other hand, since part of the discharge pressure of the vane pump 3 is provided to the grooves 49, the vanes 53 of the vane motor 5 are pressed toward the cam ring 29 from the center side of the rotor 37 when the vane motor 5 is driven.

The vane pump 3 is driven by the rotative driven force of the engine through a pulley 63. The vane motor 5 is driven by receiving the discharge pressure of the vane pump 3 at the vanes 53 and rotatively drives an alternator 61 as well as an oil pump for a power steering device through a pulley 63.

The axes of the cam rings 27, 29 are eccentric with respect to the axes of the housings 7, 9 and form loci 65, 67, respectively, when the housings 7, 9 are rotated by the controlled motor 21. Thus, while the housings 7, 9 are rotated, the eccentricities of the cam rings 27, 29 with respect to each of the rotors 35, 37 are mutually changed. In other words, the eccentricities in the vane pump 3 and the vane motor 5 are changed relative to one another. When the eccentricity in the vane pump 3 is zero, the amount of discharged fluid of the vane pump 3 is zero, so that the vane motor 5 is halted. In this condition, since the eccentricity in the vane motor 5 is maximum, if the housings 7, 9 are rotated by the controlled motor 21, the eccentricity in the vane pump 3 is gradually increased, thereby increasing the discharge from the vane pump 3. At the same time, the eccentricity in the vane motor 5 is gradually decreased, thereby increasing the rotative speed output from the vane motor 5. When the eccentricity in the vane pump 3 becomes maximum, the eccentricity in the vane motor 5 is minimum. Thus, a continuous speed change can be accomplished in the continuously variable transmission 1 of the first embodiment.

The structure in which an oil pump/motor type transmission is employed and in which the eccentricities in the vane pump and the vane motor are are mutually regulated allows a lower cost than that of the prior art and can easily be made small and light. Moreover, in the continuously variable transmission 1, the operation for changing the speed by using the controlled motor 21 is very simply. Furthermore, since the hydraulic fluid is circulated between the vane pump 3 and the vane motor 5 in the continuously variable transmission 1, pressure loss is low. Further, the vane pump/motor 3, 5 have a lower hydraulic loss than that of a swash plate type piston pump/motor, thereby allowing better efficiency. Further, since the oil guide is provided inside the casing 11 and no hydraulic hose and the like is employed in the continuously variable transmission unit, no problems such as an oil leakage from the unit occur.

Second Embodiment

Figure 4:
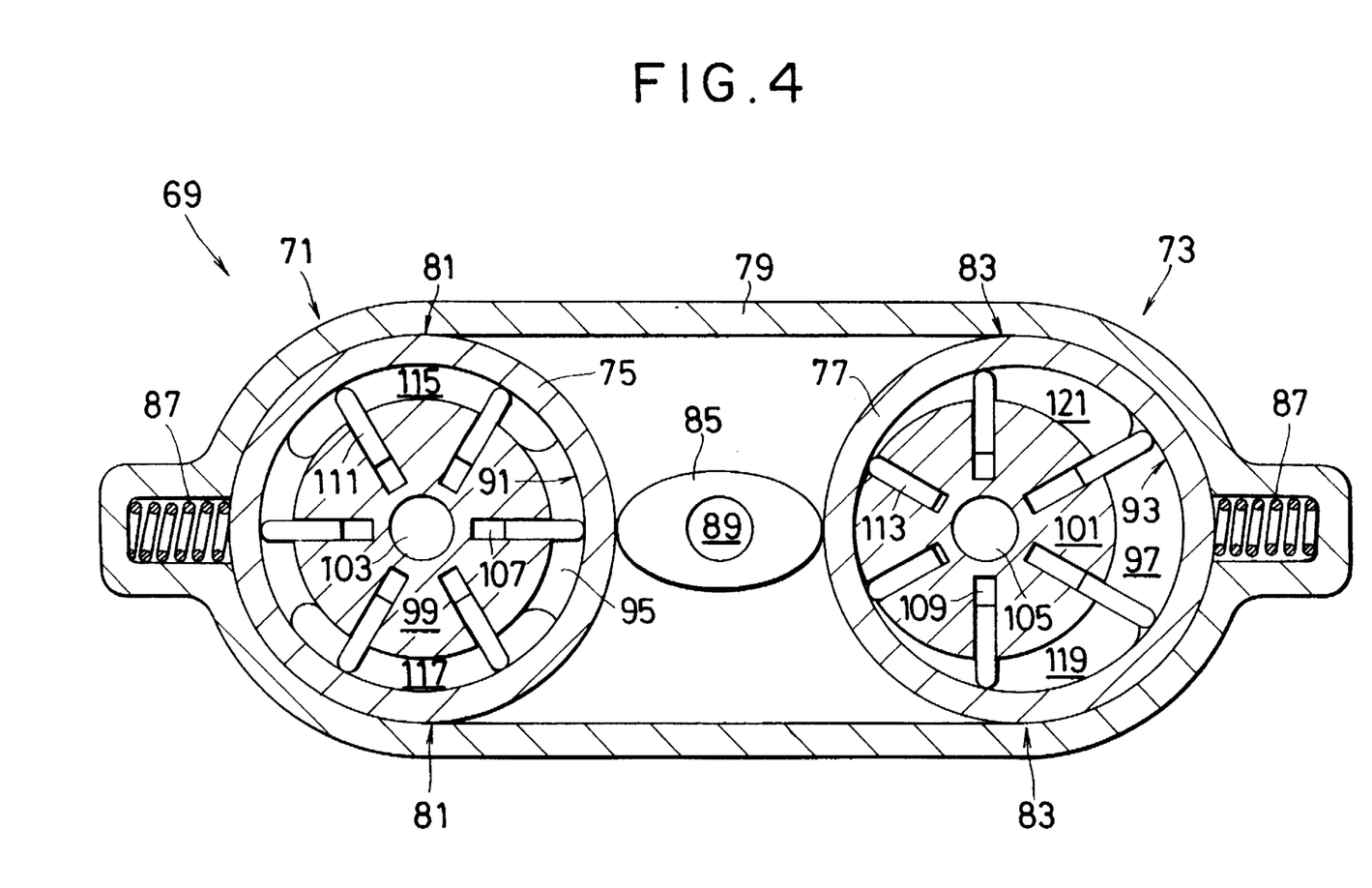
FIG. 4 is a plan view of a continuously variable transmission of a second embodiment according to the present invention.

A continuously variable transmission 69 of a second embodiment will be described hereinafter using FIG. 4. In the second embodiment below, right and left directions correspond to the right and left directions in FIG. 4.

The continuously variable transmission 69 is equipped with a vane pump 71 and a vane motor 73. Housings 75, 77 of the vane pump 71 and the vane motor 73 respectively are slidably supported inside a casing 79 so as to be slidable in the right and left directions. Namely, the casing 79 has a cylindrical guiding groove 81, 83 inside which the slide motion of the housings 75, 77 are guided. A cam 85 is interposed between the housings 75, 77. Springs 87, 87 are positioned at each of the right and left ends of the casing 79 respectively, pressing each of the housings 75, 77 toward the cam 85. The cam 85 is connected to a controlled motor through a shaft 89. Specifically, the cam 85 is securely mounted on the shaft 89 and rotates with the shaft 89. Further, the cam 85 is formed so that the interval between the housings 75, 77 is changed by the rotation thereof. Therefore, in the condition shown in FIG. 4, when the cam 85 begins to rotate, the springs 87 expand, so that the housing 75 moves or slides to the right and the housing 77 moves or slides to the left.

Oil pressure chambers 95, 97 which can be filled with a variable amount of hydraulic fluid are formed between the casing 79 and cam rings 91, 93 respectively forming the internal circumferences of the housings 75, 77. Rotors (vane rotors) 99, 101 are positioned inside the oil pressure chambers 95, 97 and are accommodated inside the cam rings 91, 93, respectively. The rotors 99, 101 are provided with rotor shafts 103, 105 respectively rotatably secured to the casing 79, respectively. In other words, each rotor 99, 101 is rotatably secured to the casing 79.

The rotors 99, 101 have a plurality of radially extending grooves 107, 109 respectively inside which a plurality of vanes 111, 113 are slidably held along the diametrical directions of the rotors 35, 37. The casing 79 is provided with a suction port 115 and a discharge port 117 for the vane pump 71 and is provided with a fluid inlet port 119 and a fluid outlet port 121 for the vane motor 73. The casing 79 is further provided with an oil guide which links the suction port 115 with the fluid outlet port 121 and which links the discharge port 117 with the fluid inlet port 119.

The vane pump 71 is driven by the rotative driven force of an engine through a shaft 103. The vane motor 73 is driven by receiving the discharge pressure of the vane pump 71 at vanes 118 and outputs a rotative force.

While the housings 75, 77 are sliding from the rotation of the cam 85 as mentioned above, the eccentricities of the cam rings 91, 98 with respect to each of the rotors 99, 101 respectively can be changed at the same time. In other words, while the housings 75, 77 are sliding, eccentricities in the vane pump 71 and the vane motor 73 can be changed at the same time. When the eccentricity in the vane pump 71 is zero as shown in FIG. 4, the amount of fluid discharged from the vane pump 71 is zero, so that the vane motor 73 is halted. In this condition, the eccentricity in the vane motor 73 is maximum. In this condition if the eccentricity in the vane pump 71 is gradually increased, the eccentricity in the vane motor 73 is gradually decreased at the same time. Thus, a continuous speed change can be accomplished in the continuously variable transmission 69 of the second embodiment.

Similarly to the first embodiment, the continuously variable transmission 69 has a simple structure, and therefore not only can be inexpensive made but also can easily be made small and light. Moreover, in the continuously variable transmission 69, the operation for changing the speed is simple and the efficiency is high.

Third Embodiment

Figure 5:
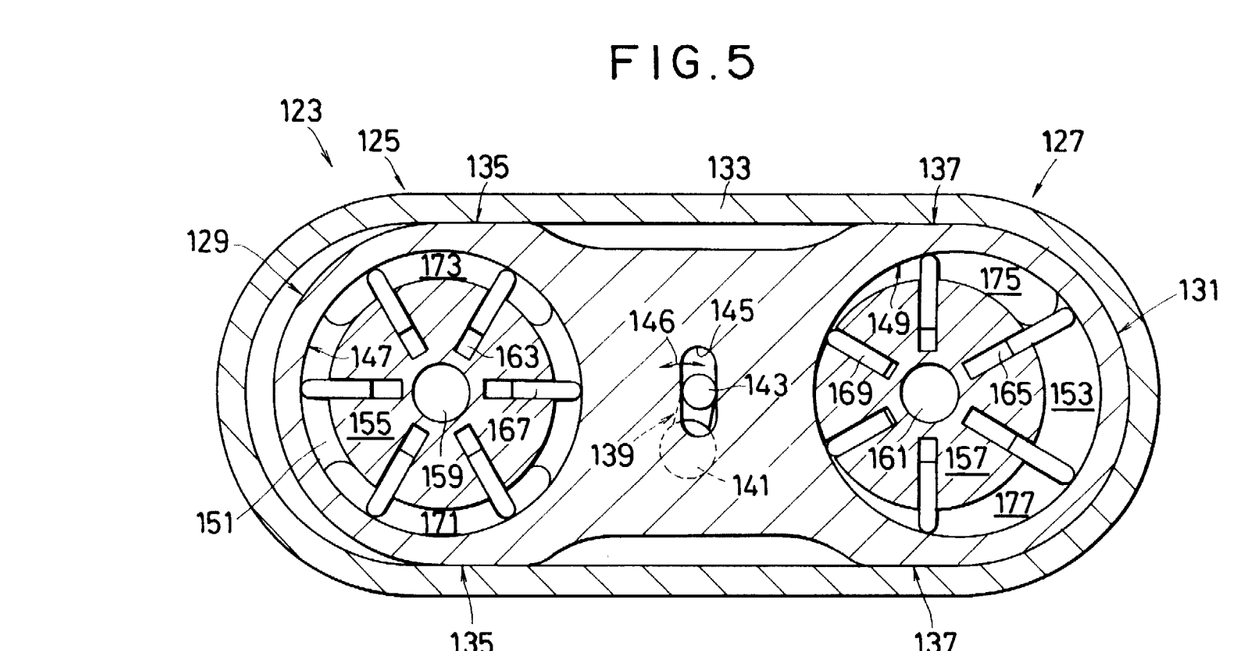
FIG. 5 is a cross sectional view of a continuously variable transmission of a third embodiment according to the present invention.
Figure 6:
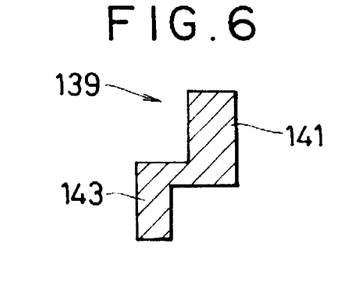
FIG. 6 is a cross sectional view of an swinging member which is employed in the continuously variable transmission shown in FIG. 5.

Next, a third embodiment of a continuously variable transmission 123 will be described using FIGS. 5 and 6. In the third embodiment below, the right and left directions correspond to the right and left directions in FIG. 4.

The continuously variable transmission 123 is equipped with a vane pump 125 and a vane motor 127.

Housings 129, 131 which are provided for a vane pump 125 and the vane motor 127, respectively, are formed integrally. The housings 129,181 are supported inside a casing 133 and are slidable to the right and left. Namely, the casing has a cylindrical guiding groove 135,137 inside which the sliding motions of the housings 129, 131 are guided respectively. A shaft portion 141 of an operating lever 139 as shown in FIG. 6 is swingably secured to the casing 133. A swinging axle 143 provided in the operating lever 139 is swingably held inside a slot 145 which is defined by the housings 129, 131. The operating lever 139 is swung by a controlled motor as shown by an arrow 146, thereby sliding the housings 129,131 to the left or to the right. Namely, the swinging axle 143, while being swung to the left or right by the controlled motor, pushes the housing 129 to the left or the housing 131 to the right.

Oil pressure chambers 151, 153 which can be filled with a variable amount of hydraulic fluid are formed between cam rings 147, 149 respectively provided in the housings 129,131 and the casing 138. Rotors (vane rotors) 155, 157 are positioned inside the oil pressure chambers 151,153, respectively. The rotors 155, 157 are rotatably secured to the casing 133 by rotor shafts 159, 161, respectively.

The rotors 155, 157 are respectively provided with a plurality of radially extending grooves 163, 165 inside which a plurality of vanes 167, 169 are slidably held along the diametrical directions of the rotors 155, 157, respectively. The casing 133 is provided with a suction port 171 and a discharge port 173 for the vane pump 125 and is provided with a fluid inlet port 175 and a fluid outlet port 177 for the vane motor 127. The casing 133 is further provided with an oil guide which links the suction port 171 with the fluid outlet port 177 and which links the discharge port 173 with the fluid inlet port 175.

The vane pump 125 is driven by the rotative driven force of an engine through a shaft 159. The vane motor 127 is driven by receiving the discharge pressure of the vane pump 125 and outputs a rotative force.

While the housings 129, 131 are sliding as the result of the swing motion of the operation lever 139 as mentioned above, the eccentricities of the cam rings 147, 149 with respect to the rotors 155, 157 respectively may be changed at the same time. In other words, while the housings 129, 131 are sliding, the eccentricities in the vane pump 125 and the vane motor 127 may be changed at the same time. When the eccentricity in the vane pump 125 is zero as shown in FIG. 5, the amount of fluid discharged from the vane pump 125 is zero, thus the vane motor 127 is halted. In this condition, the eccentricity in the vane motor 127 is maximum. From this condition, if the eccentricity in the vane pump 125 is gradually increased, the eccentricity in the vane motor 73 will be gradually decreased at the same time. Thus, a continuous speed change can be accomplished in the continuously variable transmission 123 of the third embodiment.

Similarly to the first and second embodiments, the continuously variable transmission 123 has a simple structure and therefore not only can be inexpensively made but also can easily be made small and light. Moreover, in the continuously variable transmission 69, the operation for changing the speed is simple and the efficiency is high. Further, since the motion of the housings 129, 131 does not depend on any springs, it can be more accurate than that of the housings 75, 77 of the second embodiment.

Fourth Embodiment

Next, a fourth embodiment of a continuously variable transmission 201 will be described using FIGS. 7–10. The continuously variable transmission 201 may be employed for conveying the driving force of an engine to an auxiliary mechanism in an automobile. In the fourth embodiment below, the right and left directions correspond to the right and left directions in FIGS. 7–9.

Figure 7:
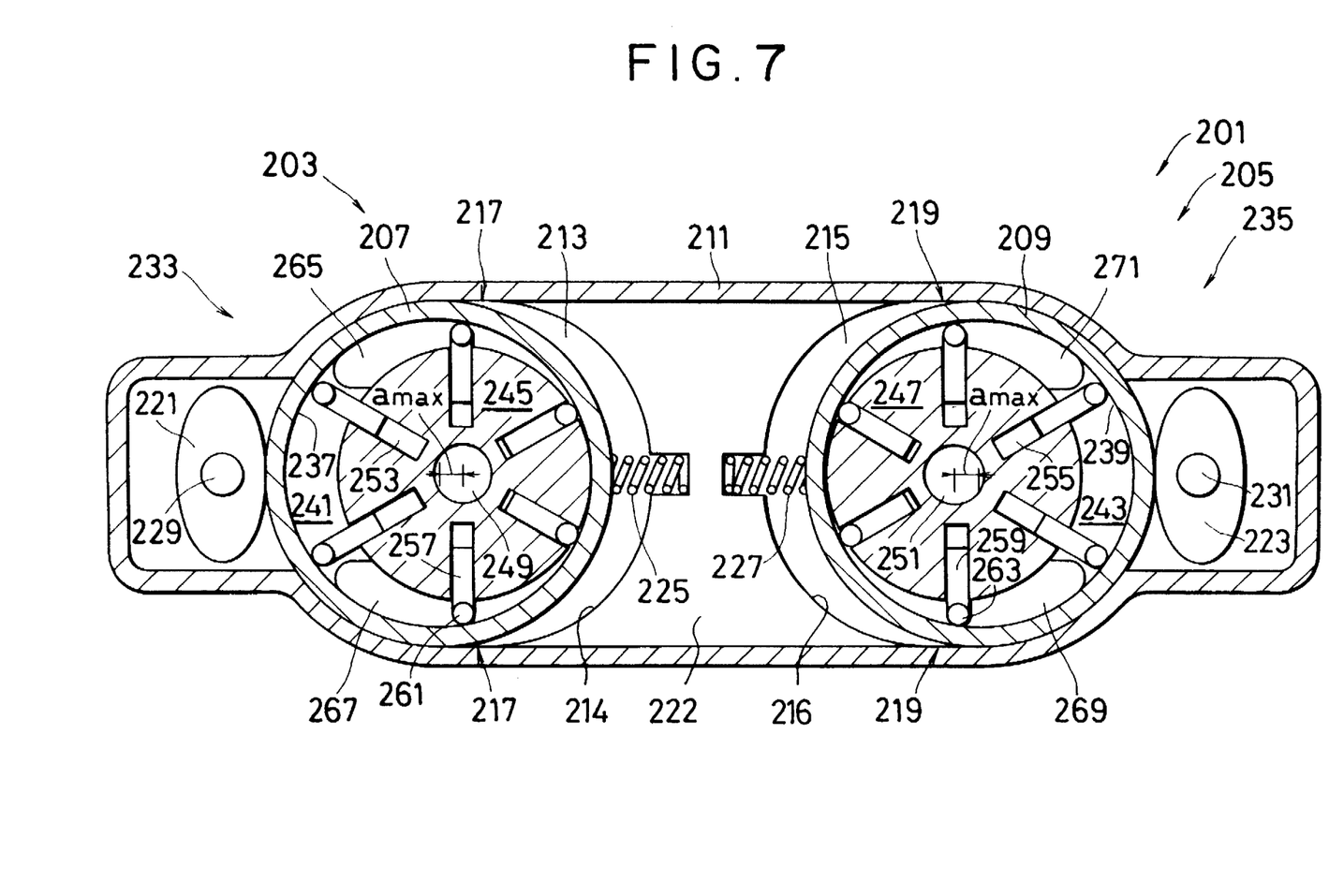
FIG. 7 is a cross sectional view of a continuously variable transmission of a fourth embodiment according to the present invention, showing a condition in which the eccentricities of a vane pump and a vane motor are both maximum.
Figure 8:
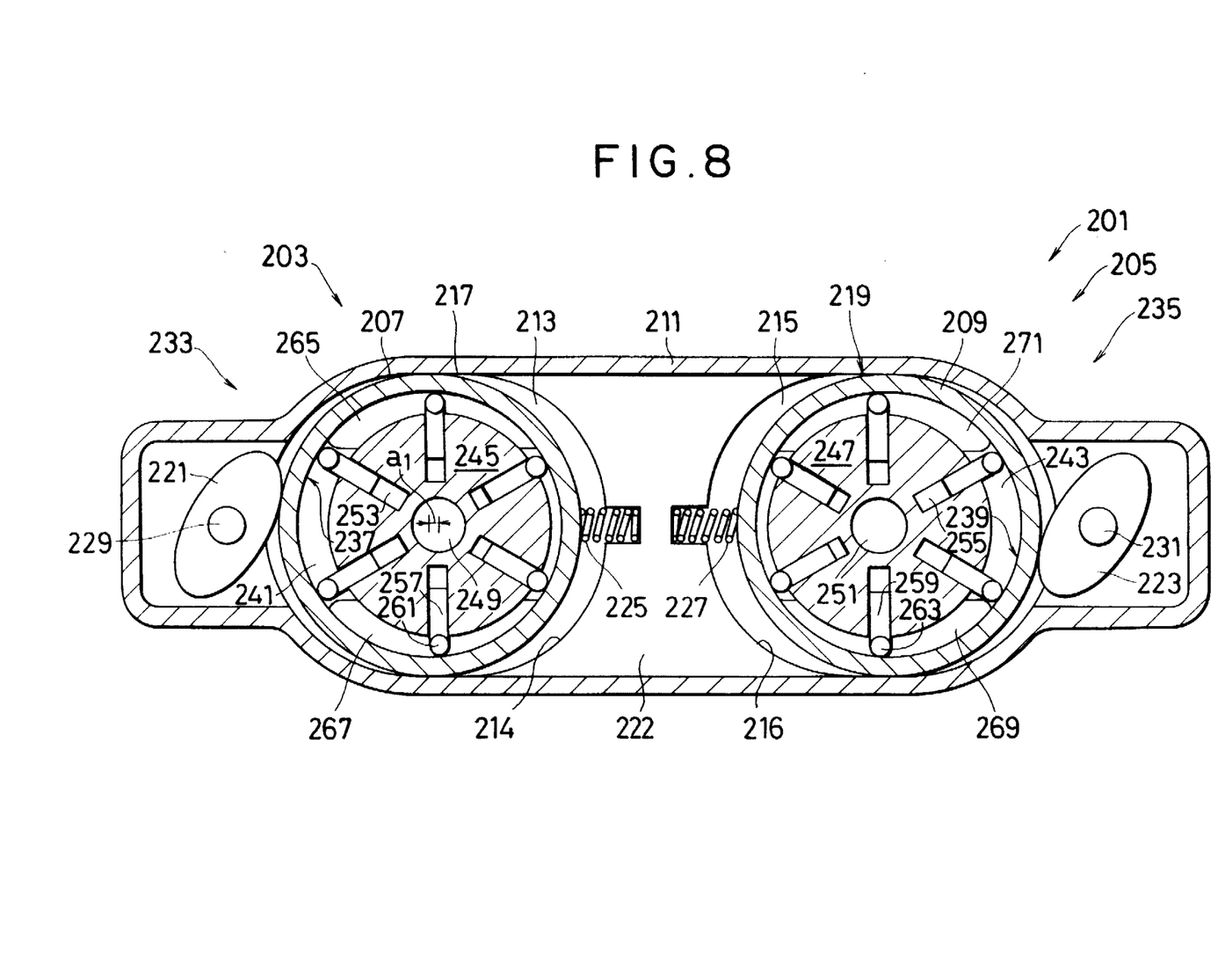
FIG. 8 is a cross sectional view of the continuously variable transmission of the fourth embodiment, showing a condition in which the eccentricity of the vane pump is smaller than that shown in FIG. 7.
Figure 9:
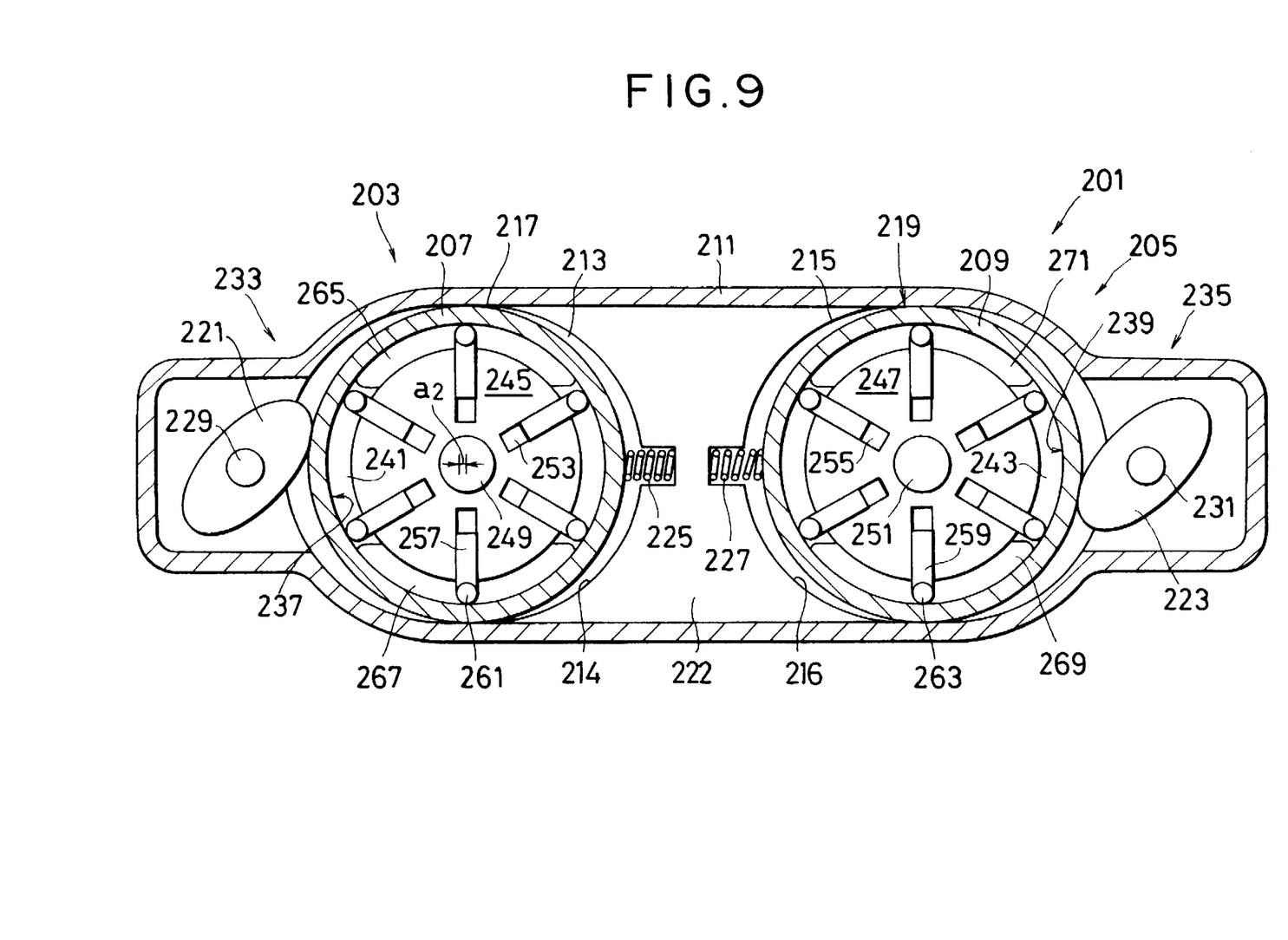
FIG. 9 is a cross sectional view of the continuously variable transmission of the fourth embodiment, showing a condition in which the eccentricity of the vane pump is smaller than that shown in FIG. 8.

The continuously variable transmission 201 is equipped with a vane pump 203 and a vane motor 20. Housings 207, 209 of the vane pump 203 and the vane motor 205 respectively are slidably supported inside chambers 213, 215 which are provided in a casing 211. Namely, the casing 211 has an intervening part 222 which is interposed between the housings 207, 209. Further, the casing 211 has a pair of guiding grooves 217, 219 inside which the housings 75, 77 respectively are slidingly guided to the right and left. Cams 221, 223 are positioned at the left side of the housing 207 and the right side of the housing 209, respectively. A Spring 225 is positioned between the housing 207 and a first face 214 which is provided on the intervening part 222 and which faces the housing 207. Similarly, a spring 227 is positioned between the housing 209 and a second face 216 which is provided on the intervening part 222 and which faces the housing 209. Thus, the housings 207, 209 are pushed toward the cams 221, 223, respectively. The cams 221,223 are connected through shafts 229, 231 to controlled motors for rotating the cams 221, 223, respectively. Namely, the cams 221,223 are securely mounted on the shafts 229, 231 and rotate with the shafts 229, 231 respectively. Further, the cam 221 is formed so that space between the housing 207 and the first face 214 is changed by the rotation of the cam 221. Similarly, the cam 221 is formed so that the space between the housing 207 and the first face 214 is changed by the rotation of the cam 221. A first slide mechanism 233 comprises the cam 221, the spring 225, and the controlled motor which is provided for moving the cam 221. A second slide mechanism 235 comprises the cam 223, the spring 227, and the controlled motor which is provided for moving the cam 223.

Oil pressure chambers 241, 243 which can be filled with a variable amount of hydraulic fluid are formed between the casing 211 and internal circumferences of the housings 207, 209, respectively. Rotors (vane rotors) 245, 247 are positioned inside the oil pressure chambers 241, 243, respectively. The rotors 245, 247 are provided with rotor shafts 249, 251 respectively, rotatably secured to the casing 211. In other words, each rotor 245,247 is rotatably secured to the casing 211.

The rotors 245, 247 have a plurality of radially extending grooves 253, 255 respectively inside which a plurality of vanes 257, 259 are slidably held along the diametrical directions of the rotors 245, 247, respectively. In order to increase abrasion resistance and improve the contact condition between the vanes 257, 259 and the housings 207, 209 to prevent oil leakage, tips 261, 263 are securely provided at the vanes' ends located close to the housings 207,209. The rotor shaft 249 is connected to an engine and the rotor shaft 251 is connected to an auxiliary mechanism.

The casing 211 is provided with a suction port 265 and a discharge port 267 for the vane pump 203 and is provided with a fluid inlet port 269 and a fluid outlet port 271 for the vane motor 205. The casing 79 is further provided with an oil guide which links the suction port 265 with the fluid outlet port 271 and which links the discharge port 267 with the fluid inlet port 269.

In the condition shown in FIG. 7 in which the housing 207 is positioned at the leftmost position and the housing 209 is positioned at the rightmost position, both the eccentricity of the housing 207 with respect to the vane rotor 245 and the eccentricity of the housing 209 with respect to the vane rotor 247 are maximum ($a_{max}$). In the above condition shown in FIG. 7, when the cams 221,223 begin to rotate, the springs 225, 227 expand, whereby the housing 207 moves to the right and the housing 209 moves to the left. Thus, the eccentricities in the vane pump 203 and the vane motor 205 are decreased.

The vane pump 203 is driven by the rotative driven force of an engine. The vane motor 205 is driven by receiving the discharge pressure of the vane pump 203 at the vanes 259 and outputs a rotative driving force to an auxiliary mechanism.

The amount of fluid discharged from the vane pump 203 is maximum when the eccentricity in the vane pump 203 is $a_{max}$ as shown in FIG. 7. The more the eccentricity in the vane pump 203 is decreased, the more the amount of fluid discharged from the vane pump 203 is decreased. When the eccentricity in the vane pump 203 is zero, the amount of fluid discharged from the vane pump 203 is zero. When the eccentricity in the vane motor 205 is $a_{max}$, the torque of the vane motor 205 is maximum and the rotative speed of the inlet fluid is minimum. On the other hand, When the eccentricity in the vane motor 205 is minimum, the torque of the vane motor 205 is minimum and the rotative speed of the inlet fluid is maximum.

Figure 10:
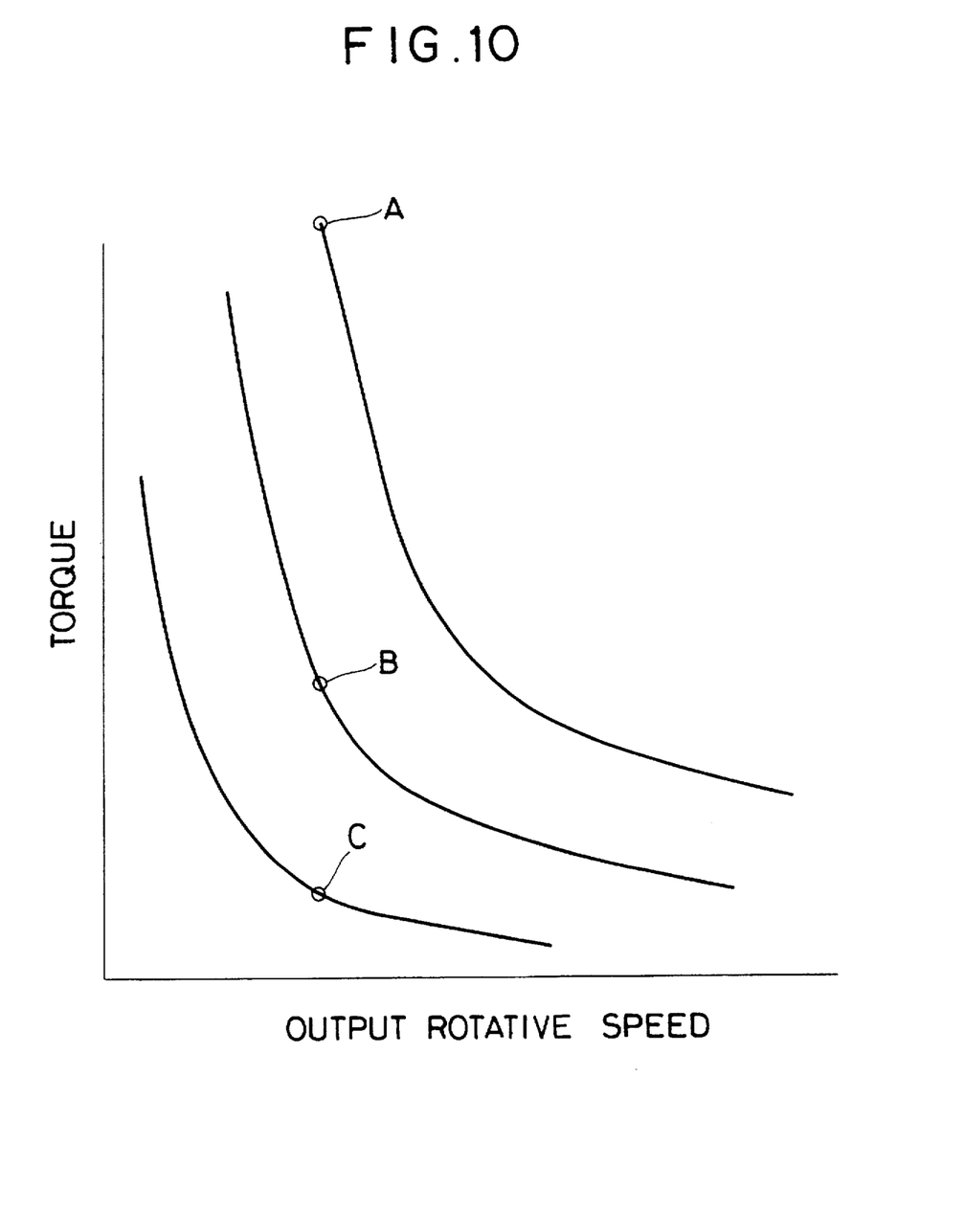
FIG. 10 is a graph showing three speed-change characteristics, each of which corresponds to each of the three conditions shown in FIGS. 7–9, respectively.

In a condition in which the rotative speed conveyed to the vane pump 203 is maintained, if the eccentricity in the vane pump 203 is maintained at $a_{max}$ as shown in FIG. 7 and the eccentricity in the vane motor 205 is changed, a characteristic of torque versus output rotative speed (a speed-change characteristic) as shown by a graph "A" in FIG. 10 is obtained. Further, as shown in FIG. 8, if the eccentricity in the vane pump 203 is maintained at $a_1$ which is smaller than $a_{max}$ and the eccentricity in the vane motor 205 is changed, another speed-change characteristic as shown by a graph "B" is obtained. The torque and the output rotative speed shown by the graph "B" are smaller than those shown by the graph "A". A graph "C" represents another speed-change characteristic corresponding to a condition in which the eccentricity in the vane pump 203 is maintained at $a_2$ which is smaller than $a_1$ and the eccentricity in the vane motor 205 is changed.

As explained above, it is possible to change the speed-change characteristic by independently regulating the eccentricities in the vane pump 203 and the vane motor 205 using the first slide mechanism 233 and the second slide mechanism 235. Therefore, it is possible to choose the most preferable speed-change characteristic in accordance with the driving and driven condition of an engine and an auxiliary mechanism. Further, it is possible to change the speed-change characteristic by regulating the eccentricities in the vane pump 203 and the vane motor 205 at the same time. Furthermore, as opposed to the above explained process, it is also possible to change the eccentricity in the vane pump 203 while the eccentricity in the vane motor 205 is maintained at a predetermined level.

The structure in which the vane pump 203 and the vane motor 205 are employed and in which the eccentricities in the vane pump and the vane motor are independently regulated allows a lower cost than that of the prior art and the structure can easily be made small and light. Moreover, in the continuously variable transmission 201, the operation for changing the speed by using the controlled motor is simple. Furthermore, since the hydraulic fluid is circulated between the vane pump 203 and the vane motor 205, pressure loss is low. Further, the vane pump/motor 203, 205 has a lower hydraulic loss than that of a swash plate type piston pump/motor, thereby allowing better efficiency. Further, since the oil guide is provided inside the casing 211 and no hydraulic hose and the like is employed in the continuously variable transmission unit, no problems such as an oil leakage occur.

While there has been described what is at present considered to be the preferred embodiment of the invention, it will be understood that various modifications may be made therein.

For example, in the above described fourth embodiment even though the housings 207, 209 respectively are independently slid in order to change the eccentricities in the vane pump and the vane motor respectively, it is possible to change the eccentricities In the vane pump and the vane motor by rotations of the housings respectively. Namely, it is possible to provide a continuously variable transmission in which the housings of the vane pump and the vane motor respectively are rotatably secured in the casing and the internal circumferences of the housings respectively are eccentric with respect to the peripheries of the housings so that when each of housings is independently rotated, each of the eccentricities in the vane pump and the vane motor is independently changed.

It is intended to cover in the appended claims all such modifications as fall within the true spirit and scope of the invention.

What is claimed is:

1. A continuously variable transmission for continuously changing the speed of a rotative driving force conveyed thereto comprising:

a casing;

a vane pump for receiving the rotative driving force and discharging a variable amount of fluid, said vane pump having a first housing movably supported inside the casing, a first rotor with a rotor shaft secured to said casing and rotatably accommodated inside said first housing, and a plurality of vanes held by said first rotor;

a vane motor driven by the pressure of the fluid discharged from said vane pump., outputting a rotative speed, and constructed so as to return the fluid discharged therefrom to said vane pump, said vane motor having a second housing movably supported inside the casing, a second rotor with a rotor shaft secured to said casing and rotatably accommodated inside said second housing, and a plurality of vanes held by said second rotor;

an eccentricity-controlling mechanism for mutually moving said first and second housings so as to gradually decrease the eccentricity of the internal circumference of said first housing with respect to said first rotor while increasing the eccentricity of the internal circumference of said second housing with respect to said second rotor, or vice versa, to regulate the rotative speed output from said vane motor, wherein said first housing has an internal circumference with a rotatable first axis which is eccentric with respect to an axis of a periphery of said first housing, said second housing has an internal circumference with a rotatable second axis which is eccentric with respect to an axis of a periphery of said second housing, and said eccentricity-controlling mechanism comprises a rotation mechanism for rotating said first and second housings.

2. The continuously variable transmission as set forth in claim 1, wherein said rotation mechanism comprises a first driving source with a driving force and first transforming means for transforming said driving force of said first driving source to rotations of said first and second housings, said transforming means having a first transmitting member attached to said first driving source and transmitting said driving force of said first driving source, a second transmitting member attached to said first housing and receiving said driving force of said first driving source through said first transmitting member, and a third transmitting member attached to said second housing and receiving said driving force of said first driving source through said first transmitting member.

3. The continuously variable transmission as set forth in claim 2, wherein said second and third transmitting members are mutually engaged so as to intertransmit said driving force of said first driving source and said first transmitting member transmits said driving force of said first driving source to said second transmitting member.

4. The continuously variable transmission as set forth in claim 3, wherein said first driving source comprises a first rotative driving force and a first shaft attached thereto and rotatable thereby, said first transmitting member comprises a gear attached around said first shaft, and said second and third transmitting members have a gear attached to the peripheries of said first and second housings respectively.

5. The continuously variable transmission as set forth in claim 1, wherein said rotation mechanism has a pair of bearings which rotatably support said first and second housings thereinside respectively.

6. A continuously variable transmission for continuously changing the speed of a rotative driving force conveyed thereto comprising:

a casing;

a vane pump for receiving the rotative driving force and discharging a variable amount of fluid, said vane pump having a first housing movable supported inside the casing, a first rotor with a rotor shaft secured to said casing and rotatably accommodated inside said first housing, and a plurality of vanes held by said first rotor, wherein said first housing includes a first peripheral gear disposed on an outer surface thereof;

a vane motor driven by the pressure of the fluid discharged from said vane pump outputting a rotative speed, and constructed so as to return the fluid discharged therefrom to said vane pump, said vane motor having a second housing movably supported inside the casing, a second rotor with a rotor shaft secured to said casing and rotatably accommodated inside said second housing, and a plurality of vanes held by said second rotor, wherein said second housing includes a second peripheral gear disposed on an outer surface thereof, said second peripheral gear being operatively coupled with said first peripheral gear such that rotation of said first housing causes a rotation of said second housing; and an eccentricity-controlling mechanism for mutually moving said first and second housings so as to gradually decrease the eccentricity of the internal circumference of said first housing with respect to said first rotor while increasing the eccentricity of the internal circumference of said second housing with respect to said second rotor, or vice versa, to regulate the rotative speed output from said vane motor, wherein said eccentricity-controlling mechanism comprises a controlled motor, a drive shaft connected to said controlled motor at a first end and driven to rotate by said controlled motor, a gear disposed on a second end of said drive shaft and rotatable therewith, said gear being operatively coupled with said peripheral gear such that rotation of said drive shaft produces a rotation of said first housing.

* * * * *